United States Patent
Malik et al.

(10) Patent No.: US 12,462,291 B2
(45) Date of Patent: Nov. 4, 2025

(54) WEBSITE MONITORING AND ASSESSMENT

(71) Applicant: MASTERCARD INTERNATIONAL INCORPORATED, Purchase, NY (US)

(72) Inventors: Raghav Malik, London (GB); Simon Phillips, York (GB); Nigel John Raynor, Surrey (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 138 days.

(21) Appl. No.: 18/031,138

(22) PCT Filed: Oct. 6, 2021

(86) PCT No.: PCT/US2021/053713
§ 371 (c)(1),
(2) Date: Apr. 10, 2023

(87) PCT Pub. No.: WO2022/081389
PCT Pub. Date: Apr. 21, 2022

(65) Prior Publication Data
US 2023/0377025 A1    Nov. 23, 2023

(30) Foreign Application Priority Data

Oct. 12, 2020 (GB) ..................... 2016175

(51) Int. Cl.
| | | |
|---|---|---|
| G06Q 30/06 | (2023.01) | |
| G06F 40/174 | (2020.01) | |
| G06Q 30/0601 | (2023.01) | |

(52) U.S. Cl.
CPC ....... *G06Q 30/0637* (2013.01); *G06F 40/174* (2020.01); *G06Q 30/0621* (2013.01); *G06Q 30/0643* (2013.01)

(58) Field of Classification Search
CPC .......... G06Q 30/0601; G06Q 30/0621; G06Q 30/0637; G06Q 30/0642
(Continued)

(56) References Cited

U.S. PATENT DOCUMENTS

| | | | |
|---|---|---|---|
| 2007/0226794 A1 * | 9/2007 | Howcroft ............. | H04N 21/442 348/E5.006 |
| 2009/0030807 A1 | 1/2009 | Rollins et al. | |

(Continued)

FOREIGN PATENT DOCUMENTS

| | | | | |
|---|---|---|---|---|
| AU | 2016206325 A1 * | 8/2016 | ............ | G06Q 30/00 |
| KR | 101691823 B1 * | 1/2017 | ........... | G06F 3/0488 |
| KR | 10-2019-0063594 | 6/2019 | | |

OTHER PUBLICATIONS

P o h l et.al.; "Personalised hypermedia presentation techniques for improving online customer relationships"; The Knowledge Engineering Review, vol. 16:2, 111-155. © 2001, Cambridge University Press DOI: 10.1017/S0269888901000108 Printed in the United Kingdom retrieved from Dialog on Jan. 17, 2025 (Year: 2001).*

(Continued)

*Primary Examiner* — Yogesh C Garg
(74) *Attorney, Agent, or Firm* — Harness, Dickey & Pierce, P.L.C.

(57) ABSTRACT

A method of measuring parameters associated with a website comprising a complex hierarchy of web pages is described. The method is used for a website adapted to support a user journey through multiple web pages to a user destination. The user journey is defined as a sequence of functional steps. A machine learning system is trained to provide a website navigation system adapted to navigate from a landing screen to a destination screen by performing each functional step in the sequence. The website is then navigated from the landing screen to the destination screen using the website navigation system. One or more param- (Continued)

eters resulting from, or associated with, one or more steps of the journey from the landing screen to the destination screen for the website are measured. A computing system suitable for performing the method, and a method of building a suitable website navigation system are also described.

11 Claims, 17 Drawing Sheets

(58) Field of Classification Search
USPC .................................................. 705/26.8
See application file for complete search history.

(56) References Cited

U.S. PATENT DOCUMENTS

| | | | |
|---|---|---|---|
| 2009/0171773 A1* | 7/2009 | Shastry | G06Q 20/322 |
| | | | 705/37 |
| 2011/0078731 A1* | 3/2011 | Nishimura | G06F 9/453 |
| | | | 725/39 |
| 2014/0215629 A1 | 7/2014 | Raz et al. | |
| 2014/0222503 A1 | 8/2014 | Vijayaraghavan et al. | |
| 2016/0188182 A1 | 6/2016 | Burkard et al. | |
| 2016/0379298 A1* | 12/2016 | Isaacson | G06Q 30/0633 |
| | | | 705/26.62 |
| 2021/0398181 A1* | 12/2021 | Saniger | G06Q 30/0617 |

OTHER PUBLICATIONS

G. Katsaros, S. Antonopoulos, D. Kyriazis and T. Varvarigou, "Service oriented license providing," 2009 IEEE International Conference on Service-Oriented Computing and Applications (SOCA), Taipei, Taiwan, 2009, pp. 1-5,, extracted from IP. Com on Jun. 16, 2025 (Year: 2009).*

* cited by examiner

CRUTCHFIELD
Seriously into audio since 1974 ᴿᴹ

Need Help? Call 1.888.955.6000

≋ / Address / Payment / Review & Submit

Shipping option
● Freight (Free)

Payment method

● Credit Card

Card Number | Expires | Security code ⓘ
Credit Card Number | MM/YY | CCV

☐ Securely save payment info in my account

[Next: Review My Order]

Or pay with a different method:
○ PayPal
○ Visa Checkout
○ Masterpass
○ Sony Financial Service "Your shipping department, working under extremely trying weather conditions, handled the order with great care and shipped it in a timely manner. The packing, double-boxed, was superb!
–Lawrence-from Camden, NJ

Order total

| Desc | Total |
|---|---|
| Merchandise | $1,199.99 |
| Shipping | Free |
| Order Total | $1,199.99 |

Apply Gift/Reward Card or Offer Code

Connect ID: 858-961-330-1

Foreign Billed Address

Accepted forms of payment:

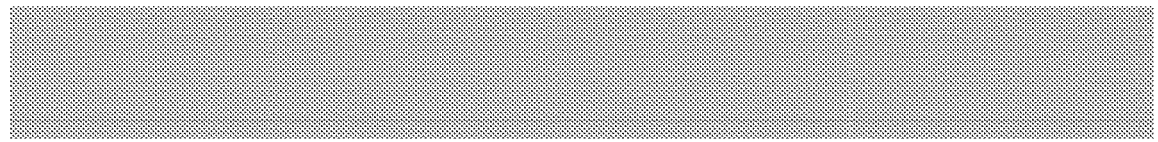

| First NAME * | SURNAME* |
|---|---|
| Andy | Lia |

Email ADDRESS *
mcshoppingtester@gmail.com

MOBILE PHONE Number *
07786123456

BUSINESS NAME

ADDRESS *
Queen Elizabeth Dr

Queen Elizabeth Dr

CITY/SUBURB *
Syndey

COUNTRY *
Australia ▼

| STATE * | POSTCODE * |
|---|---|
| Australia ▼ | 2026 |

▨ I would like to receive email updates from Sportsgirl

☐ Save my details to create an account for a

❋ FREE SHIPPING (3-5 days within Australia) $0.00

DELIVERY INSTRUCTIONS

If you would like your parcel to be delivered without a signature or left at your shipping address unattended, please advice us in the instructions above.

4. PAYMENT METHOD

| CREDIT CARD | PayPal | afterpay |

○ visa  ○ ⬤  ○ ▨

NAME ON CARD *

CARD NUMBER *

| EXPIRY DATE * | |
|---|---|
| Month ▼ | Year ▼ |

SECURITY NUMBER *
☐ What is this?

| PRODUCT | QTY | TOTAL |
|---|---|---|
| LINKEN BLEND FLIPPY MINI DRESS<br>Colour: Print<br>Size: 16 | 1 | $109.95 |

PROMO CODE

| | APPLY |

| ORDER SUB TOTAL | $109.95 |
|---|---|
| SHIPPING | $0.00 |
| PRICE INCL GST OF* | $10.00 |
| ORDER TOTAL | $109.95 |
| *EXCLUDING GIFT CARDS | |

☐ Is this a gift? Tick for wrapping

☐ I have read & agree to the Sportsgirl Terms and Conditions.

PLACE ORDER NOW

THIS IS A SECURE PROCESS

< Back to shop

I've been here before mcshoppingtester@gmail.com

•••••••••••|

LOG IN & CHECKOUT or

CONNECT WITH FACEBOOK

CONNECT WITH GOOGLE

I forgot my password

Its my first time
You can create an account later if you like.
Accounts allow you to check out faster and do other cool things on the site.

CONTINUE AS A GUEST

Figure 15C

1. Shipping

Email

☒ I'd like to hear from Glossier

Shipping Address

First Name | Last Name

Address

Apt/Floor/Suite

City | Zip Code

State | Phone

United States

🎁 Is this a gift? Add a gift card

NEXT

2. Delivery & Payment

Delivery Option
Payment

Card number    MM/YY CVC

3. Summary

| Invisible Shield | |
| 1 x $25.00 | $25.00 |
| Subtotal | $25.00 |
| Shipping | $0.00 |
| Tax | $0.00 |
| Total | $25.00 |

By checking out, I agree to the Terms of Use and acknowledge that I have read the Privacy Policy.

Figure 15D

WEBSITE MONITORING AND ASSESSMENT

CROSS-REFERENCE TO RELATED APPLICATIONS APPLICATION

This application is a U.S. national stage filing under 35 U.S.C. § 371 of International Application No. PCT/US2021/053713, filed Oct. 6, 2021, which claims the benefit of and priority to United Kingdom Patent Application No. 2016175.8, filed Oct. 12, 2020. The entire disclosure of each of the above applications is incorporated herein by reference.

FIELD OF DISCLOSURE

The present disclosure relates to website monitoring and assessment.

BACKGROUND OF DISCLOSURE

Interaction with merchants and other service providers will frequently take place via an online interface on the public internet. While many purchases are still made in bricks-and-mortar stores, a large and increasing number are made through merchant web storefronts.

While web storefronts will typically offer some common functionality—such as a mechanism for purchasing products or services using a payment scheme—the way in which this functionality is delivered, and the other functionality available from the merchant through the web storefront, can vary very considerably. This may be challenging both to users of the web storefront and for service providers to the merchant. Users may find it hard to determine that the web storefront meets their reasonable expectations for security and quality of service, whereas the service providers may find it difficult to establish that terms of service agreed with the merchant have been met in practice.

Preferably, web storefronts should meet both the requirements of the customer and those of the merchant. This is problematic, as a user's interaction with a website will typically not involve only a single screen, as it will normally instead involve a transition through a sequence of screens according to a logic used, but not communicated, by the website.

It would be desirable to address these issues.

SUMMARY OF DISCLOSURE

In a first aspect, the disclosure provides a method of measuring parameters associated with a website comprising a complex hierarchy of web pages, wherein the website is adapted to support a user journey through multiple web pages to a user destination, the method comprising: defining the user journey as a sequence of functional steps; providing a machine learning system trained to provide a website navigation system adapted to navigate from a landing screen to a destination screen by performing each functional step in the sequence; navigating a website from the landing screen to the destination screen for that website using the website navigation system; and measuring one or more parameters resulting from, or associated with, one or more steps of the journey from the landing screen to the destination screen for the website.

In embodiments, the functional steps comprise action steps to advance the user journey to a web page to meet one or more functional requirements, and verification steps to verify that one or more functional requirements associated with a web page have been met. These action steps may comprise one or more of activating a button, selecting from a menu and filling a field. The website navigation system may in such cases comprise a database of verified data field information, such that when the website navigation system determines that a data field in a web page needs to be filled to perform a functional step, the website navigation system may then fill the data field with verified data field information for that data field from the database. In embodiments, such verified data field information may comprise address information or payment card information. In the case of payment card information, this may relate to a legitimate payment card adapted such that transaction authorisation will be declined.

The website may be an e-commerce website, in which case the destination screen may be a screen indicating that a transaction has been performed using the e-commerce website.

In embodiments, measuring one or more parameters may comprise detecting specific text or images on one or more web pages of the website. It may also comprise detecting specific functionality on one or more pages of the website. It may also comprise detecting specific security vulnerabilities on one or more pages of the website.

In a second aspect, the disclosure provides a computing system adapted to measure parameters associated with a website comprising a complex hierarchy of web pages, wherein the website is adapted to support a user journey through multiple web pages to a user destination, the computing system comprising: a website navigation system, wherein the website navigation system comprises a machine learning system trained to navigate an arbitrary website adapted to reach the user destination by navigating from a landing screen to a destination screen by a user journey defined as a sequence of functional steps, wherein the website navigation system is trained to navigate from the landing screen to the destination screen by performing each functional step in the sequence of functional steps; and a website measurement system, wherein the website measurement system is adapted to use the website navigation system to navigate through the arbitrary website whereupon the website measurement system measures one or more parameters resulting from, or associated with, one or more steps of the journey from the landing screen to the destination screen for the website.

The functional steps may then comprise action steps to advance the user journey to a web page to meet one or more functional requirements, and verification steps to verify that one or more functional requirements associated with a web page have been met. The website navigation system may comprise a database of verified data field information, such that when the website navigation system is adapted to determine that a data field in a web page needs to be filled to perform a functional step, the website navigation system may be adapted to fill the data field with verified data field information for that data field from the database. The verified data field information may comprise one or more of address information and payment card information.

The website may be an e-commerce website and the destination screen may be a screen indicating that a transaction has been performed using the e-commerce website.

The one or more parameters which the website measurement system is adapted to measure may comprise one or more of the following: detecting specific text or images on one or more web pages of the website; detecting specific functionality on one or more pages of the website; and detecting specific security vulnerabilities on one or more pages of the website.

In a third aspect, the disclosure provides a method of building a website navigation system for navigating through a website comprising a complex hierarchy of web pages, wherein the website is adapted to support a user journey through multiple web pages to a user destination, the method comprising: defining the user journey as a sequence of functional steps; and training a machine learning system to perform each functional step in the sequence, whereupon the website navigation system adapted to navigate from a landing screen to a destination screen of the website.

The functional steps may comprise action steps to advance the user journey to a web page to meet one or more functional requirements, and verification steps to verify that one or more functional requirements associated with a web page have been met. One or more action steps may be adapted to access a database of verified data field information, wherein when the action step determines that a data field in a web page needs to be filled to perform a functional step, the action step may then fill the data field with verified data field information for that data field from the database. Such a verified data field information may comprise address information, or payment card information. In the case of payment card information, this may relate to a legitimate payment card adapted such that transaction authorisation will be declined.

The website navigation system may be trained to navigate an e-commerce website. In such a case, the destination screen may be a screen indicating that a transaction has been performed using the e-commerce website.

DESCRIPTION OF FIGURES

Embodiments of the disclosure will Brief now be described, by way of example, with reference to the accompanying Figures. of which:

FIG. 13 shows use of an embodiment of the disclosure in determining that use of materials on a website meets agreements or permissions;

FIGS. 14A to 14C show use of an embodiment of the disclosure in evaluating checkout strategies and functionality;

Figure 15B:
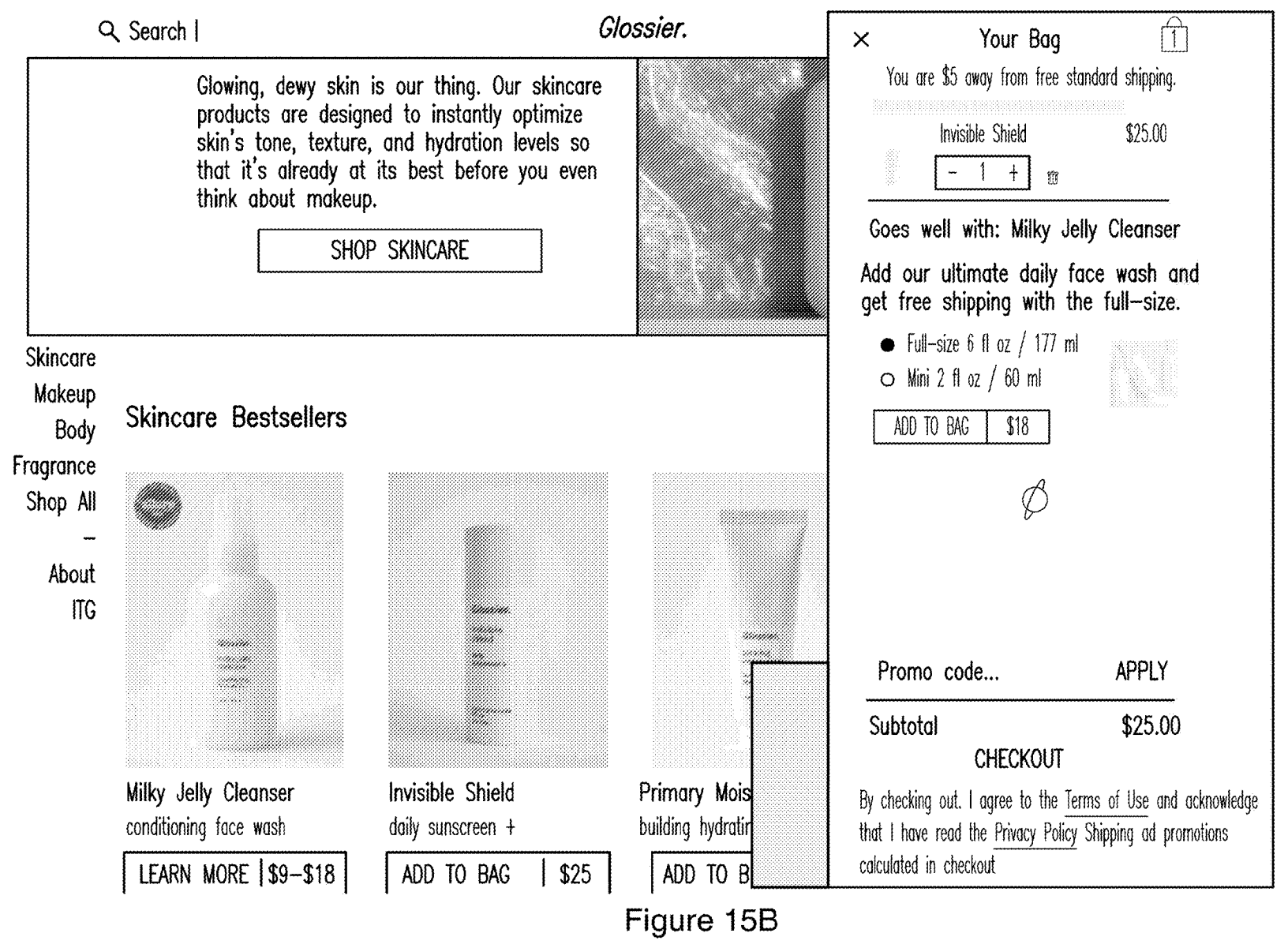

FIGS. 15A to 15D show use of an embodiment of the disclosure for market intelligence, to understand the organization of websites of interest;

DESCRIPTION OF SPECIFIC EMBODIMENTS

Specific embodiments of the disclosure will be described below, with reference to the Figures.

Figure 1:
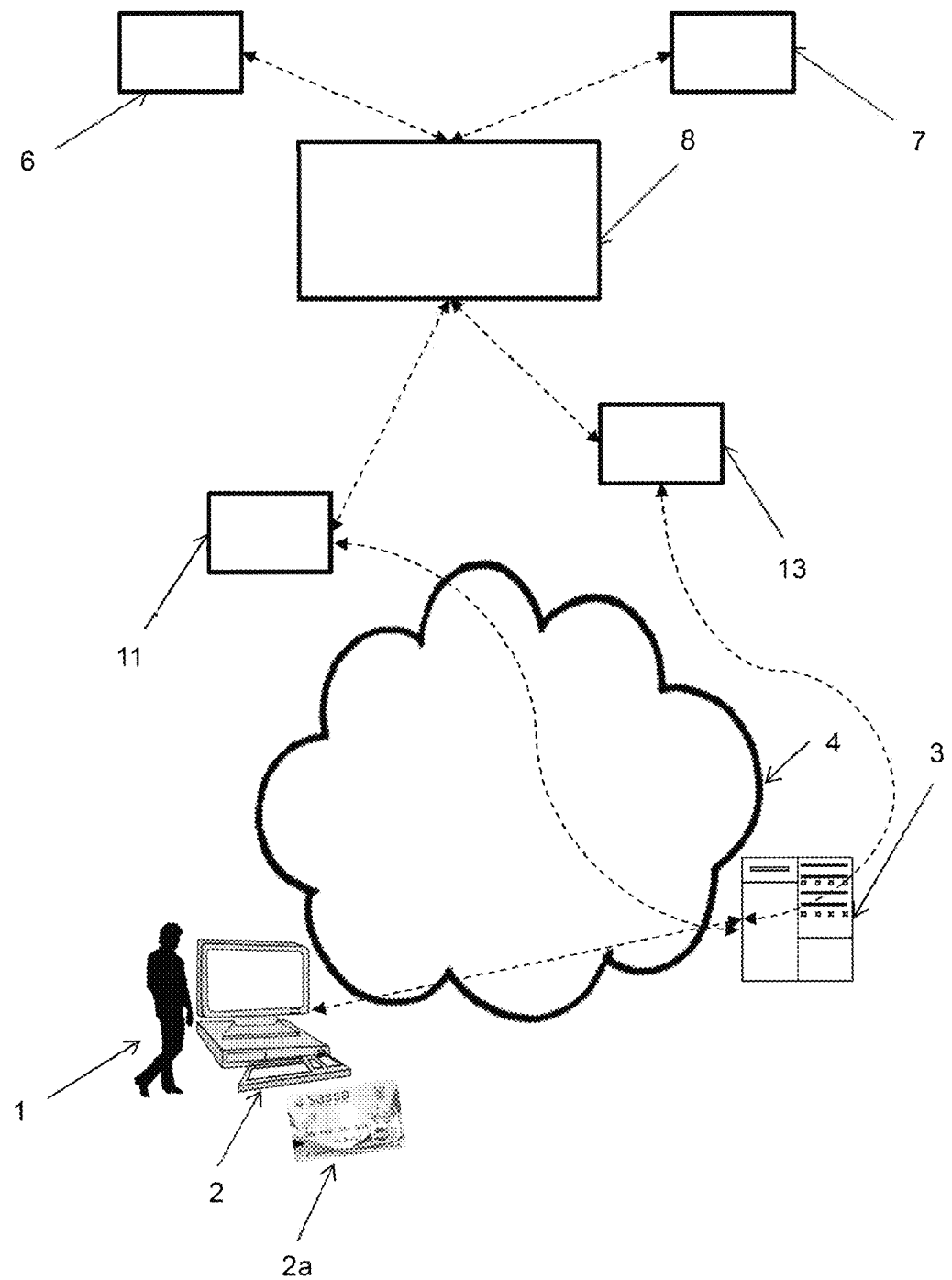
FIG. 1 shows a web shopping infrastructure in which embodiments of the disclosure may be deployed.

The invention will be described in the context of a web storefront—a website provided by a merchant server accessed by a user computer to make a transaction—and the elements of a web shopping system and supporting transaction scheme infrastructure is shown in FIG. 1. A user 1 equipped with an appropriate computing device—in this case a desktop PC 2, but laptop computers, tablets and mobile telephones would be other possibilities—is able to communicate with a merchant server 3 over a computing network 4 (such as the public Internet). The user has a payment card 2a which the user will use in conjunction with their computing device 2 to perform transactions. This payment card is associated with a user account. A transaction made between the user 1 and the merchant server 3 can be submitted to a transaction system 8, in this case through merchant transaction system gateway 13. The transaction system 8 connects to an issuing bank 6 that holds the user account and an acquiring bank 7 that holds a merchant account. The transaction system enables the user 1 to be authenticated by the issuing bank 6, and it enables a transaction between the user and the merchant to be authorised and then performed by using funds from the user account at the issuing bank 6 and paying them into a merchant account held by the acquiring bank 7. Further details of the four-party transaction scheme model are described for completeness at the end of this description with reference to FIG. 17. A suitable transaction system 8 may be one that implements EMV protocols (specifications are generally available from EMVCo at https://www.emvco.com/specifications.aspx).

Figure 2:
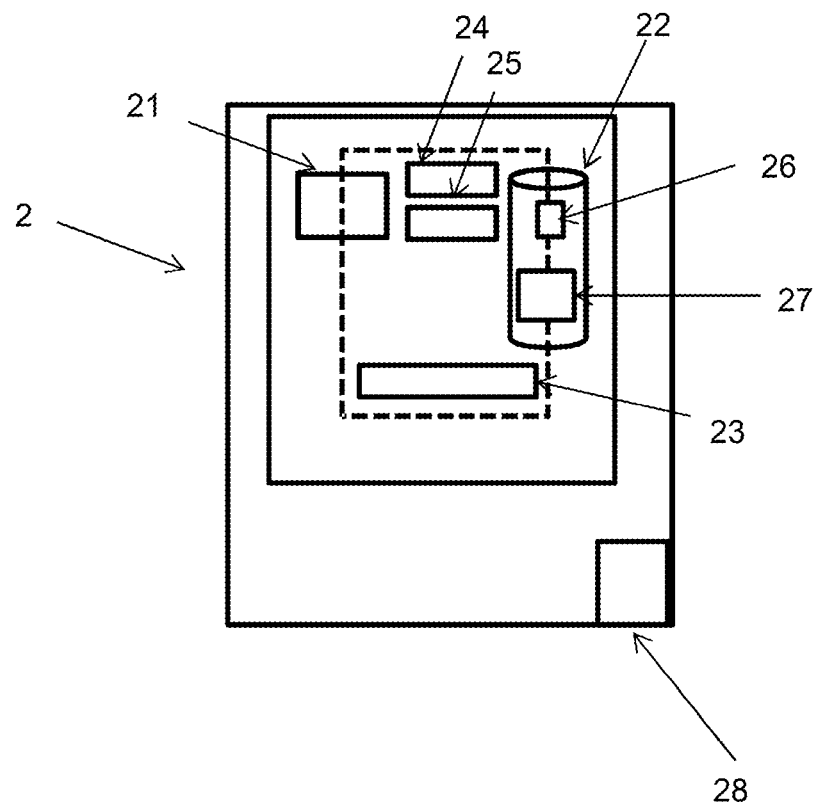
FIG. 2 shows elements of a computing device adapted to make purchases using the web shopping infrastructure of FIG. 1.

FIG. 2 shows the user computing device 2 in functional terms. The user computing device 2 has one or more processors 21 and memories 22, between them defining an application space in which a plurality of applications can run under control of an operating system 23, including a browser 25. The memories 22 may contain one or more physically or logically protected memory areas 26 to allow user credentials and cryptographic material to be held securely. These are typical elements of a standard user computing device—payment over a standard web storefront does not require a banking application to be present on the user computing device (though this can be present in embodiments), as payment is typically by direct entry of necessary credit card details. The user computing device 2 has networking capability 28 of some type, such as WiFi.

In embodiments of the disclosure, the user computing device is adapted for website monitoring, not simply to make transactions. Additional elements used for website monitoring according to embodiments of the disclosure include a monitoring application 24 and a monitoring database 27. The detailed operation of these elements will be described further below.

In practice, embodiments of the disclosure may be performed by a "user" that is not a consumer using a personal computing device. This may for example be a server 11 associated with the transaction scheme 8. This may provide all the functionality described above for the user computing device 2 including the monitoring functionality.

Figure 3:
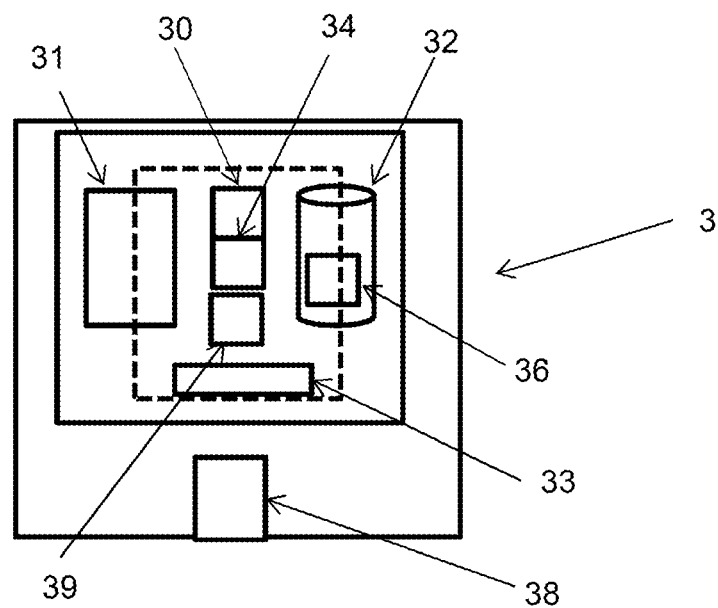
FIG. 3 shows elements of a computing device adapted to act as a merchant server operating a web storefront in the web shopping infrastructure of FIG. 1.

FIG. 3 shows the merchant server 3 in functional terms. The merchant server 3 also has one or more processors 31 and memories 32, with an operating system 33 defining an operating environment within which a plurality of applications and services will run. These applications include a web storefront application 30, a payment system 34 and an order processing system 39 (described here as single applications for convenience of reference, though in practice these may each be implemented as a set of applications, or as an application including components from multiple sources). The web storefront application 30 provides the essential elements of the customer journey through the merchant website, including providing all screens seen by the user and generally defining the user interface to the merchant website. It will provide means to allow the user to interact with the payment system 34, which provides the mechanism for the merchant website to interact with its payment service provider (or other service provider) responsible for the merchant transaction system gateway 13. A completed order will pass from the website to the order processing system 39, which will also need to interact with the web storefront application 30 and the payment system 34, in that the order will be sent from processing when established through the web storefront and confirmed when the payment system 34 indicates successful payment. The merchant server may again have protected memory areas 36 to allow secure cryptographic operations. The merchant server also has networking capability 38 (typically comprising a connection to the public Internet through a telephone or fibre network).

Figure 4:
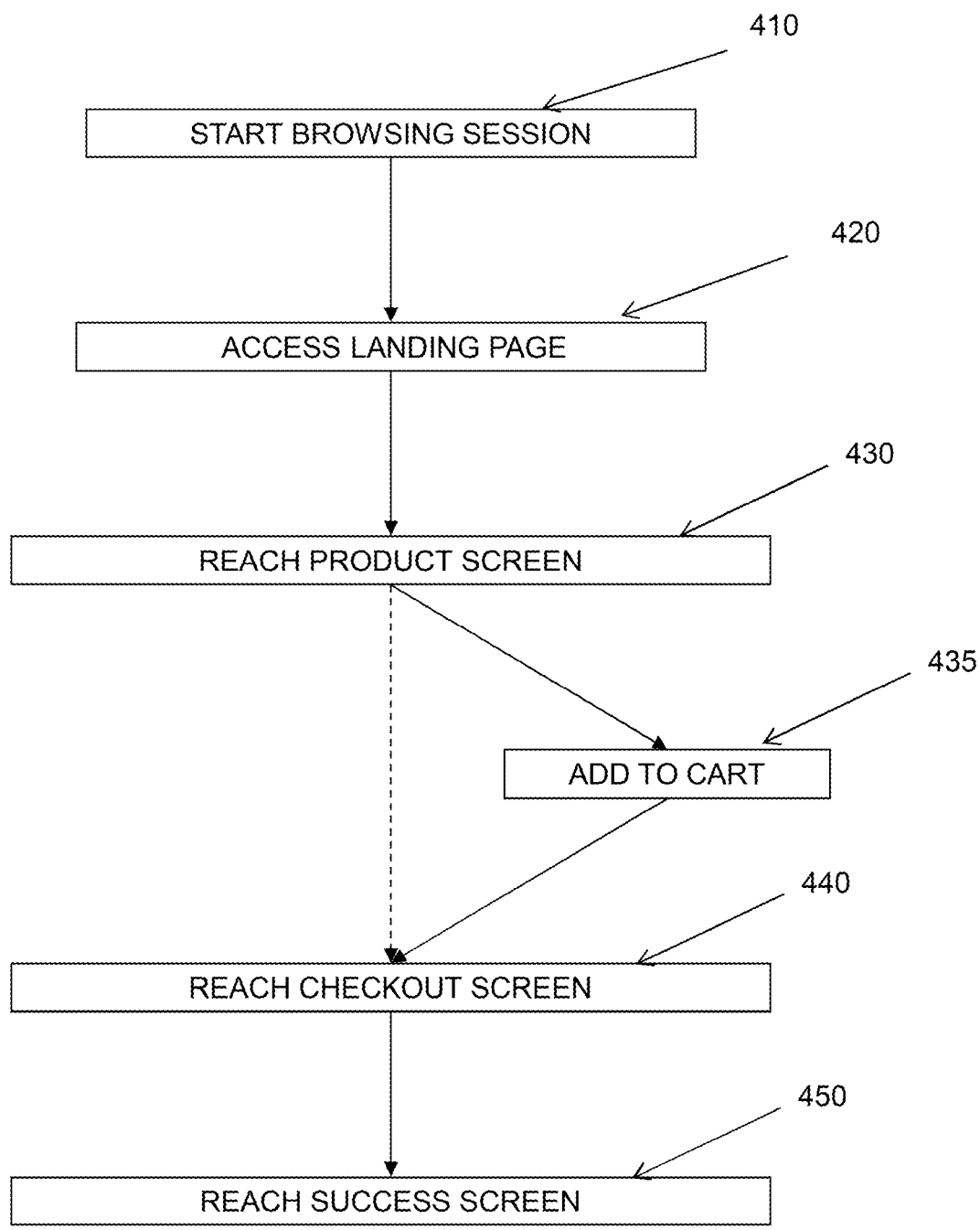
FIG. 4 illustrates a typical customer journey through a web storefront.

FIG. 4 illustrates a typical customer journey through a web storefront. A customer will start a browsing session 410 and access a landing page 420 of a merchant website—this is the opening screen of the web storefront. The customer will browse the offerings provided in the online store—this may involve using direct links and drop-down menus, and possibly navigating through several screens, and may also require actions such as suppression of pop-ups—to reach a product screen 430 where a product (or service) that the user wants to purchase is identified, and where there is a link to purchase the product (more likely, this will be a link to add the purchase to a shopping cart 435). In order to add the purchase to the cart or otherwise make it ready for purchase, it may be necessary to select particular options (such as colour and size for an item of clothing). To complete the purchase, it is necessary to move from the selected product or products to a checkout screen 440 where payment details can be entered, and a transaction performed. At the end of this process there will typically be a success screen 450 to indicate that the transaction has completed.

Figure 5:
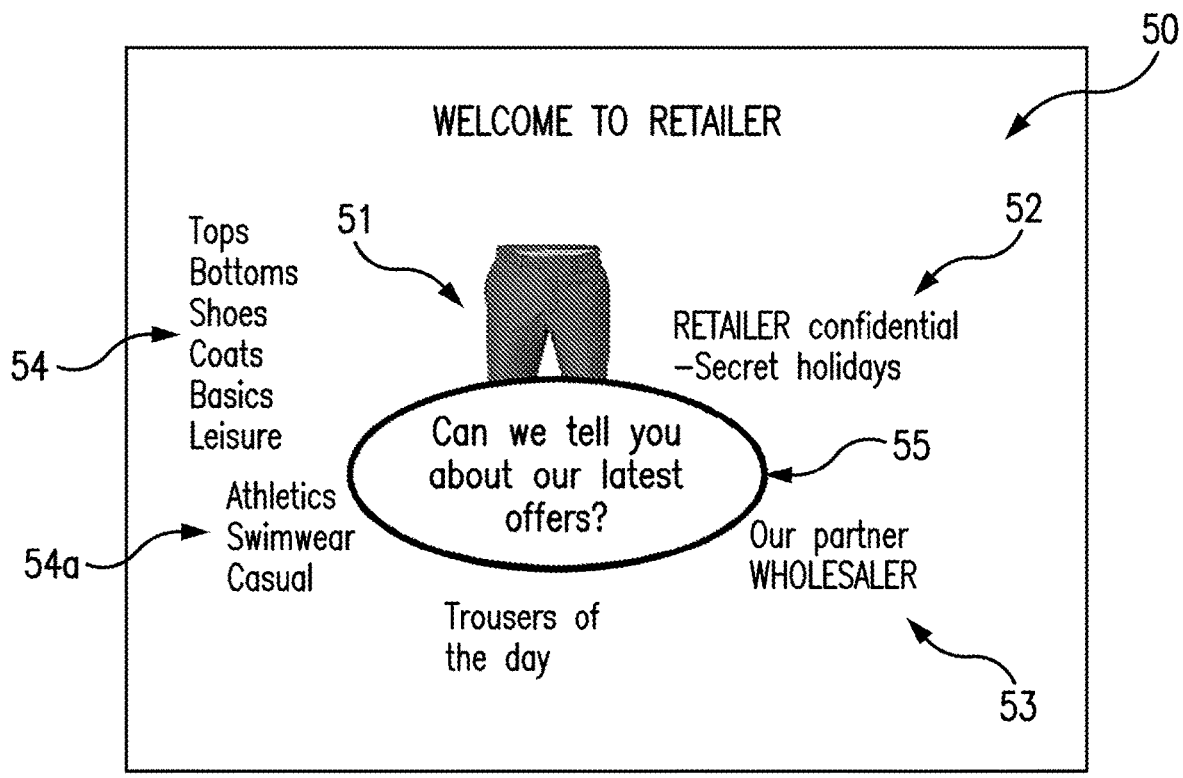
FIG. 5 illustrates an exemplary opening screen in the customer journey of FIG. 4.

FIG. 5 illustrates an exemplary opening screen 50 in the customer journey of FIG. 4. This is effectively the storefront of a web store, and it is likely to have particular offers or other advertising as the main feature of the page. A pop-up 55 is shown which may require suppression before onward progress. Some of these features may involve direct links 51 to particular products, but others may be magazine-like content 52 or even links to other sites 53. To browse the main content of the store it will often be necessary to use drop-down menus 54—such as the expanded drop-down menu 54a—in order to select items. This may involve movement through one or two further screens in order to reach a specific product screen—for example, the drop-down menu item "shirts" may provide a page full of shirt images with brief associated text, and one of these may need to be selected to reach detailed product selection and configuration.

Figure 6:
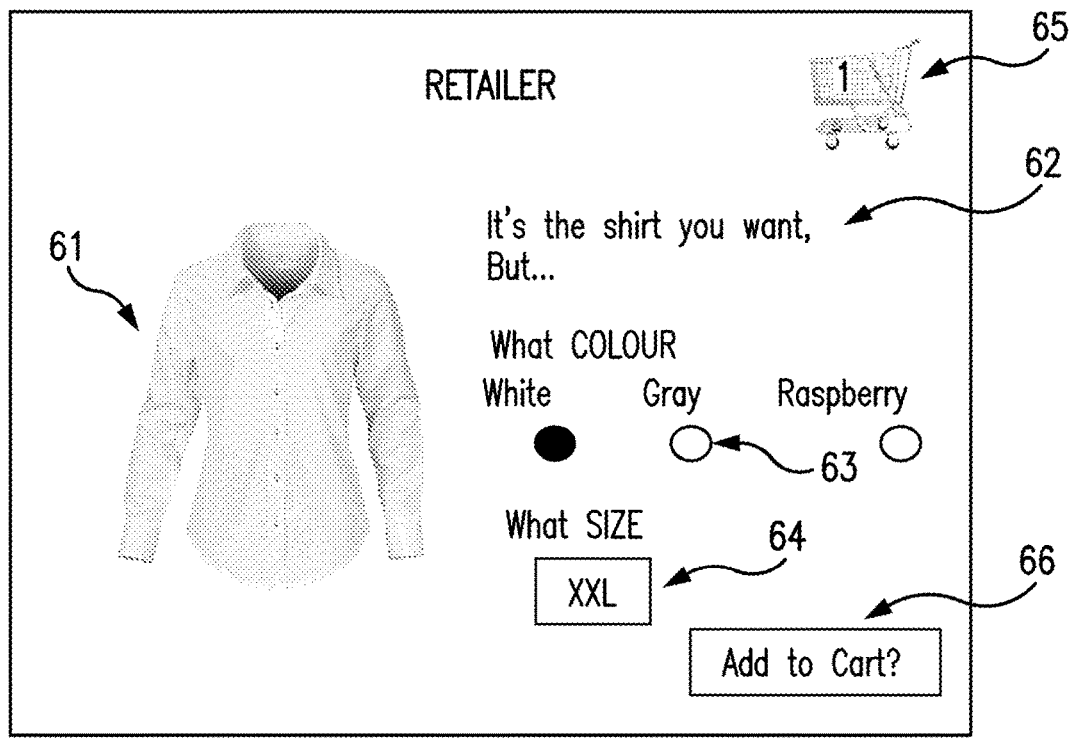
FIG. 6 illustrates an exemplary product screen in the customer journey of FIG. 4.

FIG. 6 illustrates an exemplary product screen in the customer journey of FIG. 4. Here a specific shirt is identified by product image 61 and associated text 62. However, it cannot be simply selected for purchase, as particular options for the product need to be selected and may not have pre-determined default values—in other cases, this could involve selecting a particular product configuration. In this case, radio buttons 63 are used for selection of colour, at which point a drop-down menu 64 can be opened to allow size selection (with available sizes being determined dynamically based on the colour selected). Once these selections have been made, the chosen shirt is added to the shopping cart identified 65 in the top corner of the screen by pressing buy button 66.

Figure 7:
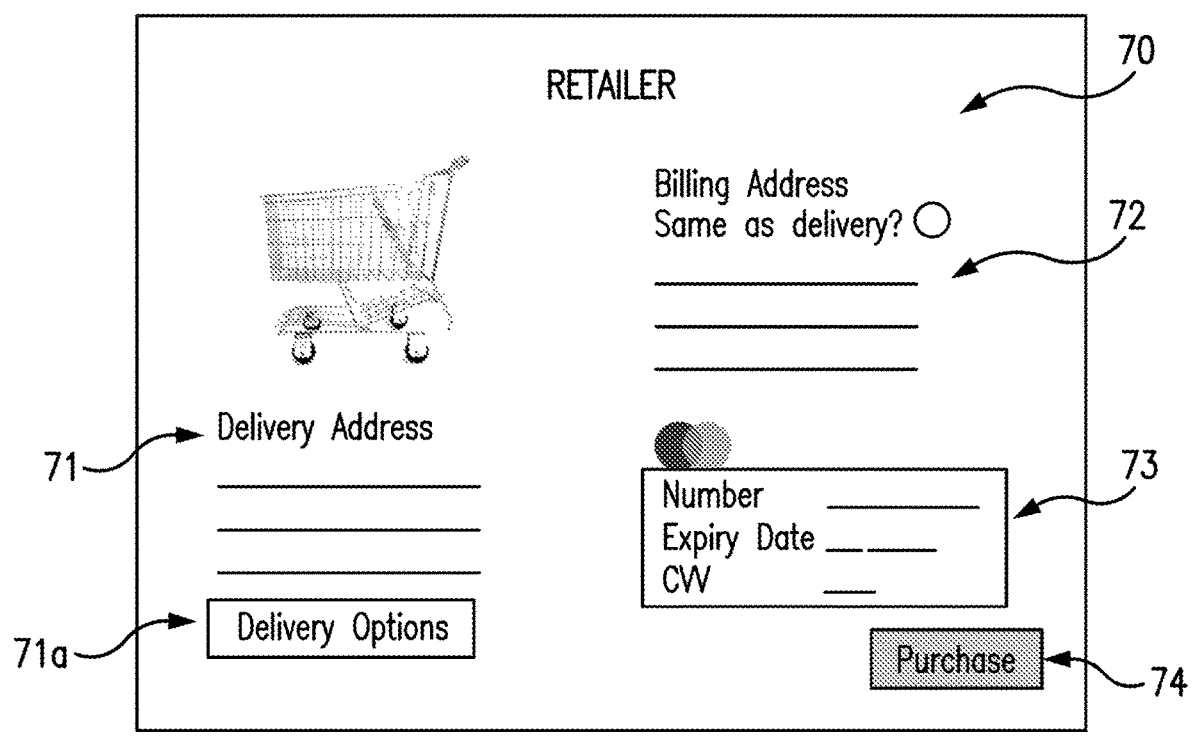
FIG. 7 illustrates an exemplary checkout screen in the customer journey of FIG. 4.

FIG. 7 illustrates an exemplary checkout screen in the customer journey of FIG. 4. This will typically be reached by populating the shopping cart with at least one item, and then selecting an option for checkout. In some designs this may be reachable directly from a product screen, but in others it may require the cart to be positively selected. The checkout screen 70 here shows all elements typically required—in practice, this may be realised by a journey through several screens rather than by having every element on a single screen. The checkout screen 70 shows a delivery address 71 with delivery options 71a, a billing address 72 and a card details section 73. There is also a payment button 74 which typically cannot be activated until all the other elements have been completed so that there is a complete order. Once the payment button 74 has been pressed there will typically be a further security layer such as 3-D Secure, particularly where necessary to meet requirements such as SCA (Strong Customer Authentication, as mandated under PSD2, the EU Revised Directive on Payment Services). It may be particularly desirable for, for example, a transaction scheme provider to understand how effectively such a security layer was implemented in particular merchant stores—as can be seen, this is only possible by going through a number of process steps which vary from one website to another. This is a task that would typically require direct human inspection of each website.

Figure 8:
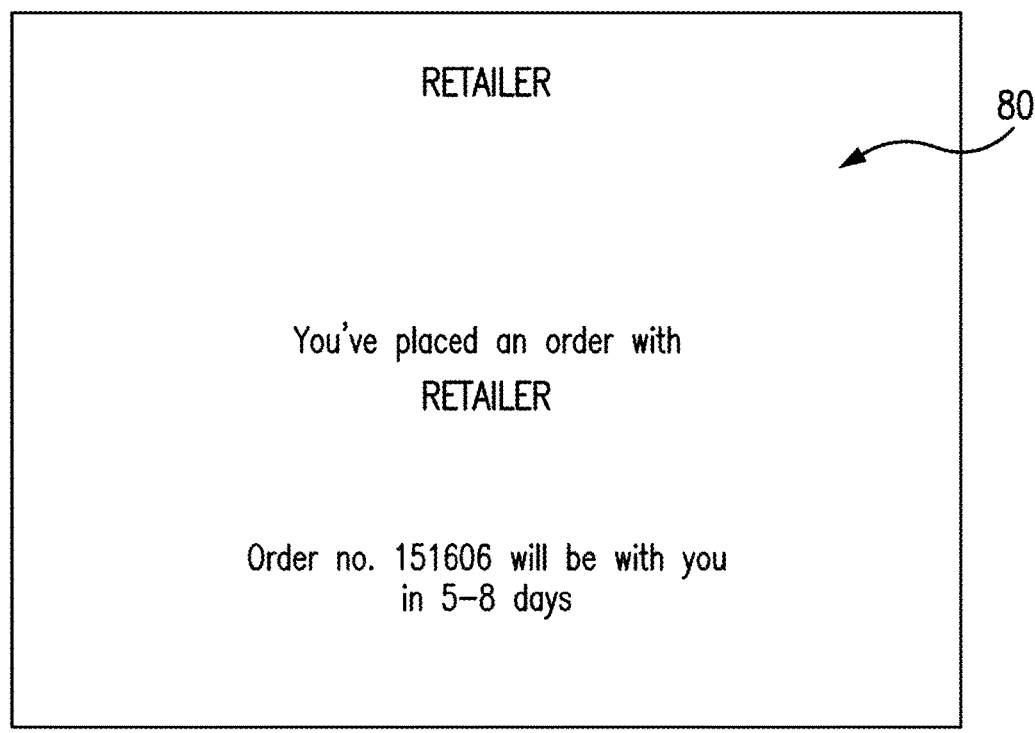
FIG. 8 illustrates an exemplary success screen in the customer journey of FIG. 4.

After successful payment, there may then be a success screen 80 as shown in FIG. 8.

Figure 9:
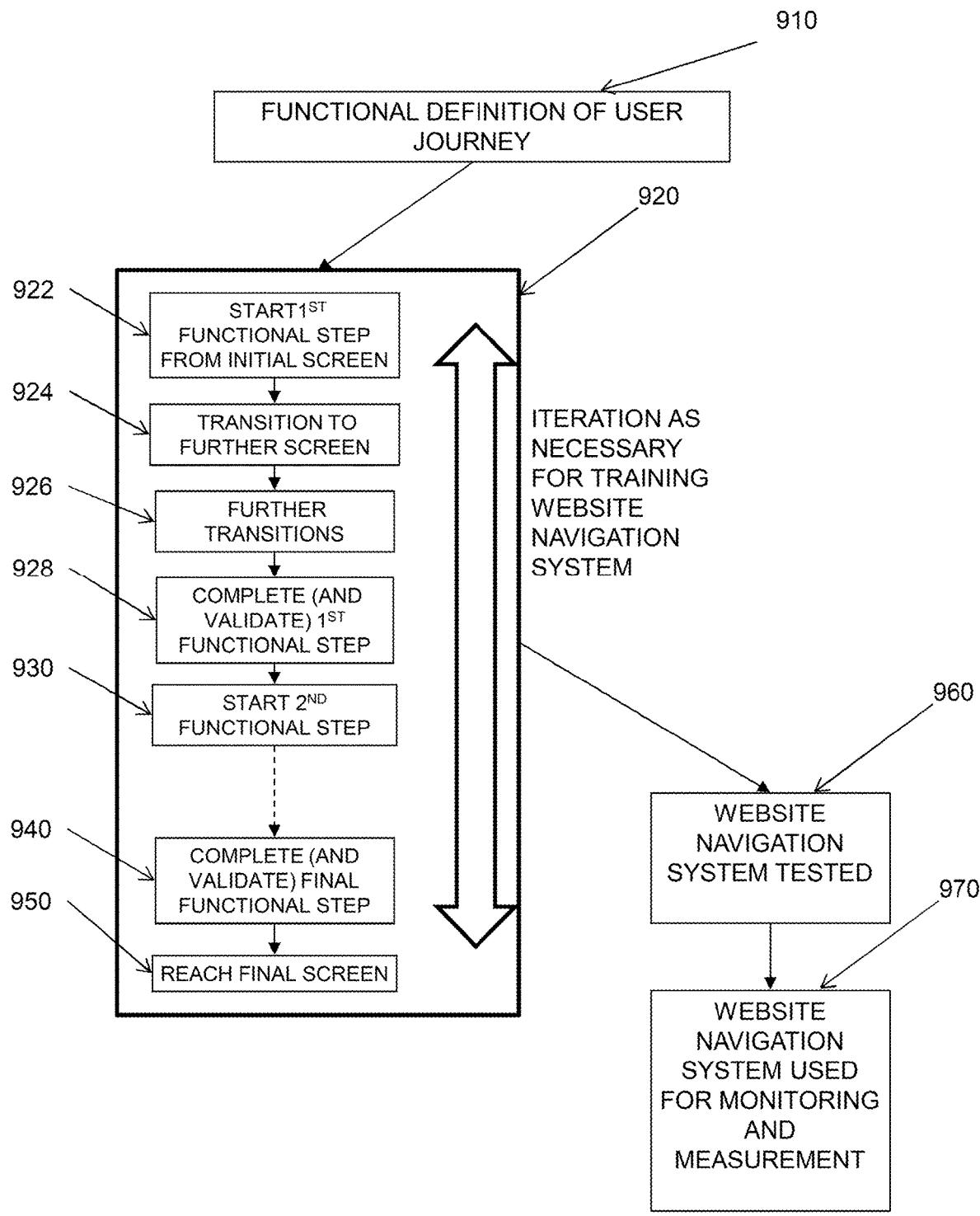
FIG. 9 illustrates a method of website monitoring according to an embodiment of the disclosure.

FIG. 9 illustrates a method of website monitoring according to an embodiment of the disclosure. This method allows for monitoring and measuring of website interactions, where these website interactions involve a user journey through multiple website screens.

The first step is to make a functional definition 910 of a user journey through the website. This may involve defining specific elements of a particular user journey, such as the steps necessary (rather than optional) in making a purchase from a merchant website.

The next step is to use this functional definition to train a machine learning system to complete this user journey through an arbitrary website. This will use typical elements of a machine learning process, such as a training phase and a test phase, but this machine learning process is determined by the functional definition. In the machine learning training process 920, the user system reaches a first website screen, and is trained to identify how to move from this website screen to continue the user journey—this will be by identifying 922 an action to take that will move along a first functional step defined for the user journey. The system then performs the transition 924 from the first website screen to a further website screen—there may be further intermediate screens 926 before the first functional step is completed 928—completion may only be determined by verification that the function has been achieved (such verification actions may also be used to determine that it is necessary to progress to a further screen to complete a functional step). Once the first functional step defined for the user journey has been completed, the machine learning system proceeds to the second functional step 930. The machine learning system proceeds in the same way until all function steps have been completed 940 (and, where necessary, verified) and a final screen has been reached 950.

An exemplary process of training to move from one website screen (web page) to another will now be described in more detail. First of all, a determination is made of what the functional type the current web page represents. To carry out this functional classification, image classification and transfer learning are used to train a model to return a probabilistic output of the likelihood that a given web page is of a given functional type (such as detailed product page, cart, payment page etc.). When this identification has been made—and the current stage of the user journey has as a consequence been identified—user-like actions can be taken by using an automated test framework such as Selenium WebDriver. In this way, exemplary user actions can be taken (for example, the selections needed to move from a detailed product page to a complete product configuration). Machine learning techniques relating to image classification may be used in completion of these user-like actions in some cases. For example, image-in-image recognition of the various user interfaces through which merchants expose product configuration options to their users may be used to help the web automation software identify which elements on the page need an interaction (button to click, selection from a drop-down menu, etc.). A successful set of actions leads to a new web page. An image classification process is then carried out as before to determine the functional role of this new web page, and so determine whether progress through the user journey has in fact been made.

The machine learning system is now a website navigation system, directed to move from an initial screen (the landing screen of the web storefront) to a destination screen (in particular cases of interest here, this may be a "payment complete" page indicating that a transaction has been successfully completed, or may be another screen that indicates that a transaction has at least passed through the transaction scheme). As will typically be the case for a machine learning system, this website navigation system is trained 920 and then tested 960 using real-world data, and the website navigation system will be determined to be available for use when training and test indicates that the system has reached a sufficient level of accuracy.

The website navigation system can now be used for website monitoring and assessment. A monitoring program can use 970 the website navigation system to navigate reliably from a landing page to a destination page, allowing screens from the landing page to the destination page to be assessed, and allowing variables associated with the journey (both directly, and in processes triggered by the journey) to be measured.

Figure 10:
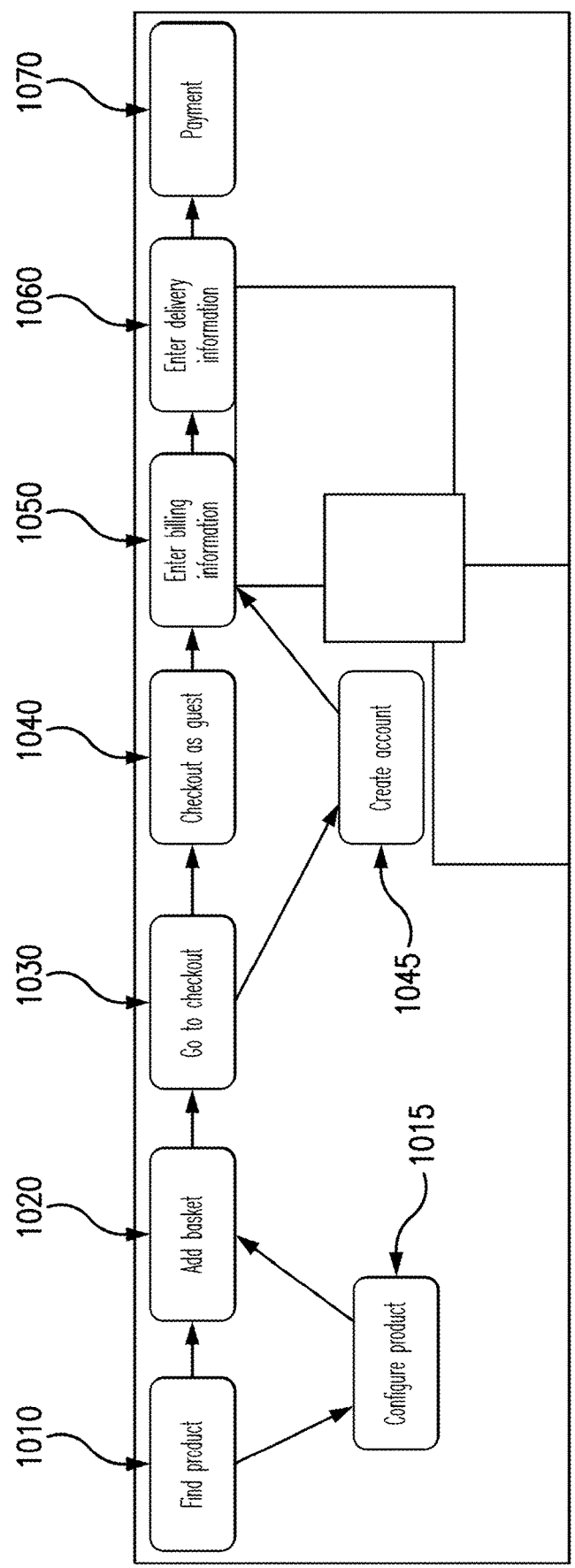
FIG. 10 shows an exemplary customer journey through a web storefront using an embodiment of the disclosure as shown in FIG. 9.

A picture of the logical flow through an exemplary website is set out in FIG. 10. The main path of actions is set out along the top row 1000: find a product 1010, add it to the basket 1020, go to the checkout 1030 and either checkout as a guest 1040 or create an account 1045, enter billing information 1050 and delivery information 1060 and go ahead to payment. Other steps may be required to progress, such as configuration of a product 1015 before it can be added to the basket The central practical problem to be solved is that this flow is not known by the website navigation system—the website navigation system however is aware of the functional result to be achieved in the form of a set of functional steps, and it has learned how to use this knowledge to navigate an arbitrary website structure such as that shown in FIG. 10 designed to achieve the result for which the website navigation system has been trained (here, product purchase).

Figure 11:
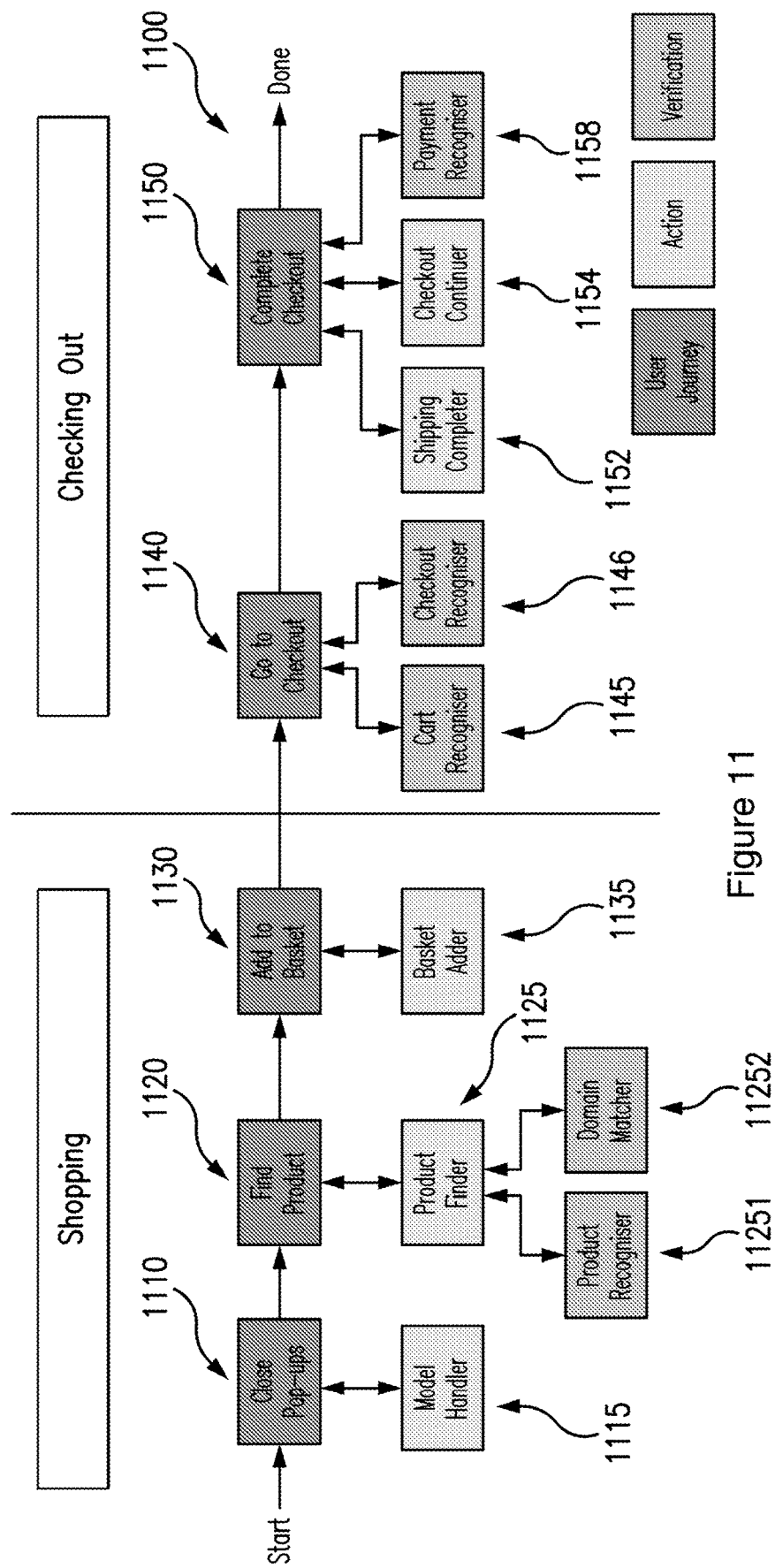
FIG. 11 shows in more detail a customer journey with associated actions and verification steps associated with a website navigation system developed according to an embodiment of the disclosure.

An indication of how this navigation is achieved is shown in FIG. 11. The user journey is shown by necessary functional steps 1100—here, the closing of pop-ups 1110 (when present), finding a product 1120, adding a product to the basket 1130, going to the checkout 1140 and completing the checkout 1150. This journey is divided into two phases: a shopping phase 1101 and a checkout phase 1102.

Each of these functional steps is addressed by either action steps, verification steps, or both. The action steps are necessary for the user journey to progress, whereas the verification steps determine that the correct point in the user journey has been reached. Here, for example, closing of pop-ups 1110 has an associated action, modal handler 1115, which is a trained action that will close pop-ups when present allowing the user journey to move to the next step. This next step, finding a product 1120, has an associated action of product finder 1125 which is trained to find a product, and two associated verifiers product recognizer 11251 which recognises that a product has been successfully found and domain matcher 11252 which is also used for verification. A reliable test of whether the page is a detailed product page is to check for an 'add to cart' or equivalent button (even if disabled). Product finder 1125 will typically involve a greater level of sophistication than simply identifying a product—it will often involve product configuration, such as establishing a colour and a size for an item of clothing so that product selection is possible (product configuration may also be established as a separate action from product finder, rather than incorporated within it)—and may involve going back a step to an earlier screen if it is not possible to. The next step, adding to the basket 1130 also has only an associated action, basket adder 1135. A good test of whether the attempt to 'add to cart' has been successful is if a change in the cart icon on a web page is detected (such as a number increment in the cart icon).

The first step in the checkout phase is going to the checkout 1140—this is different from previous steps in that there is no associated action (this will just be a button press, typically), but there are two verifiers, card recognizer 1145 (this may be adapted, for example, for semantically appropriate references to the word "card" on the webpage) and checkout recognizer 1146, to establish that the correct point has been reached. Completing the checkout 1150 is more complex—this requires two action steps realised through machine learning, the shipping completer 1152 and the checkout continuer 1154 to handle delivery and payment information, with a verifier of payment recognizer 1158 to establish that the endpoint for payment had been reached. Some actions may need to work with a bank of pre-prepared material that can be used, where necessary. For example, the shipping completer 1152 may need to be equipped with a legitimate delivery address, or a plurality of different delivery addresses in different delivery countries. It may also be necessary for some websites to create a user account to make an order—this may require not only user information such as an e-mail address and shipping address, but also password creation and e-mail address verification to meet security criteria (appropriate passwords to meet security criteria may be pre-generated for use in this process). Likewise, the checkout continuer 1154 may need to be equipped with legitimate card details, including not only a card number but associated credentials such as an expiry date and a card verification code or value. It may also be necessary to address a further stage of the transaction process, such as 3D-Secure—however, use of credit card information in a monitoring process is discussed further below.

Essentially progress along the user journey is made by using two types of step: action, or navigation, steps; and verification steps. Action steps are directed to progressing the flow through the shopping and checkout processes—they involve navigation to try links that could progress the flow, together with entry of data needed to complete data fields that need to be completed to progress the flow. By contrast, verification steps are directed to determining whether the intended point has been reached—for example "have I succeeded at: finding a product/adding to cart/finding the checkout page/reaching the payment page". Either type of step may use recognition techniques to determine the position—for example, the HTML content may be parsed to identify specific phrases which may indicate a particular functional significance to the page or a region of it.

The navigation steps result in the website navigation system providing webpages to the verification steps (which may also be considered validators, or validation processes, in this context), and these tell the navigation system whether the goal has been reached, an alternative is needed, or whether a deeper dive is required.

The website navigation system may be supplemented with additional routines as a part of the monitoring process—the monitoring process may seek to determine particular information from intermediate pages, rather than purely evaluate results from the process as a whole. For example, image recognition may be used to spot logos used on pages—in this way it can be determined whether these are current or out-of-date—and icons can be analysed (such as a shopping cart icon) to see, if changes have been made. Screenshots can be captured at each stage of the flow for offline analysis. Website data capture may include, for example, screenshots or video, page load time, the number of clicks needed to reach checkout, the type of customer information required to reach checkout and the type of checkout experience (direct card payment, payment service provider and so on).

Figure 12:
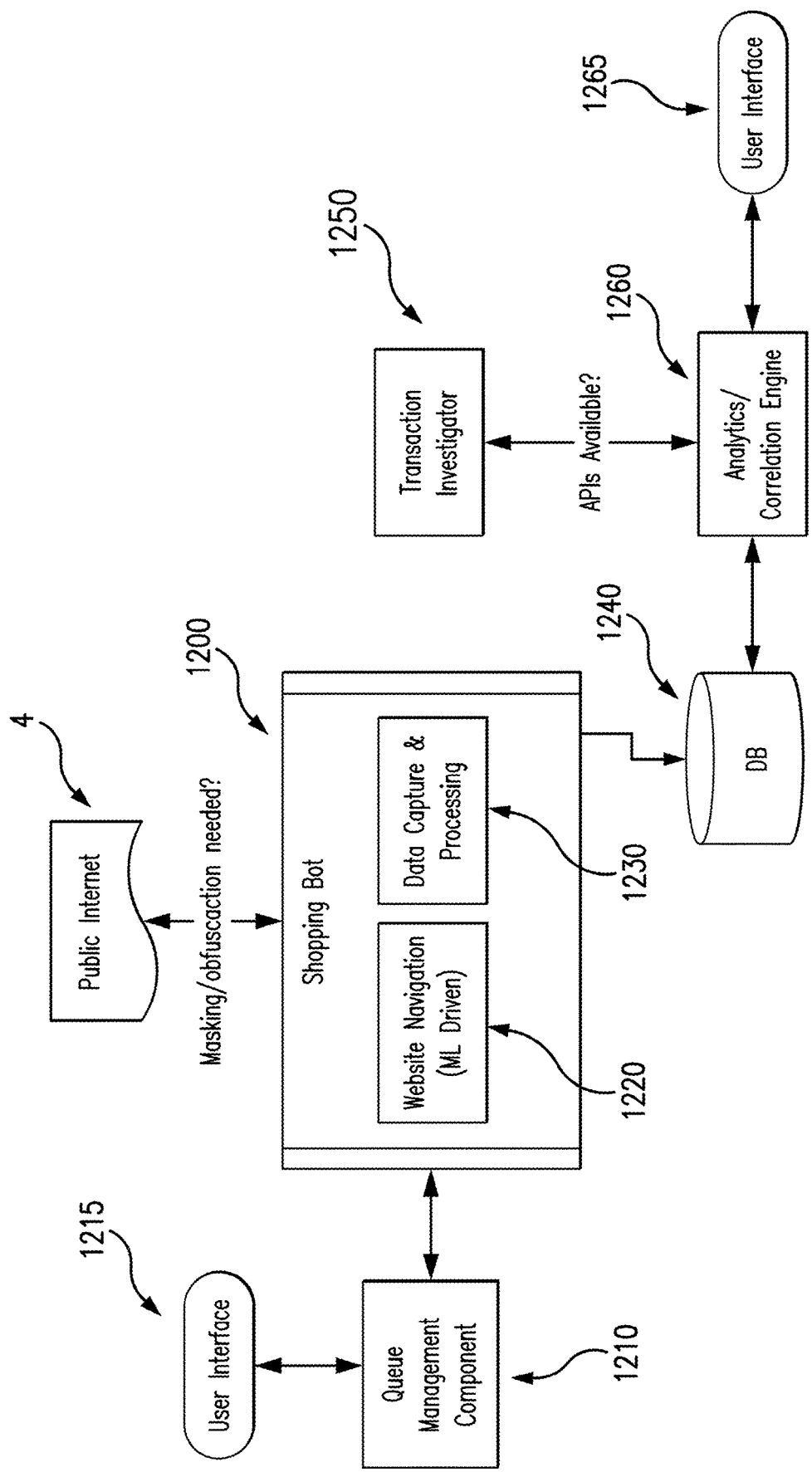
FIG. 12 illustrates in more detail functional elements of a monitoring system adapted to implement a method of website monitoring according to an embodiment of the disclosure.
Figure 15A:
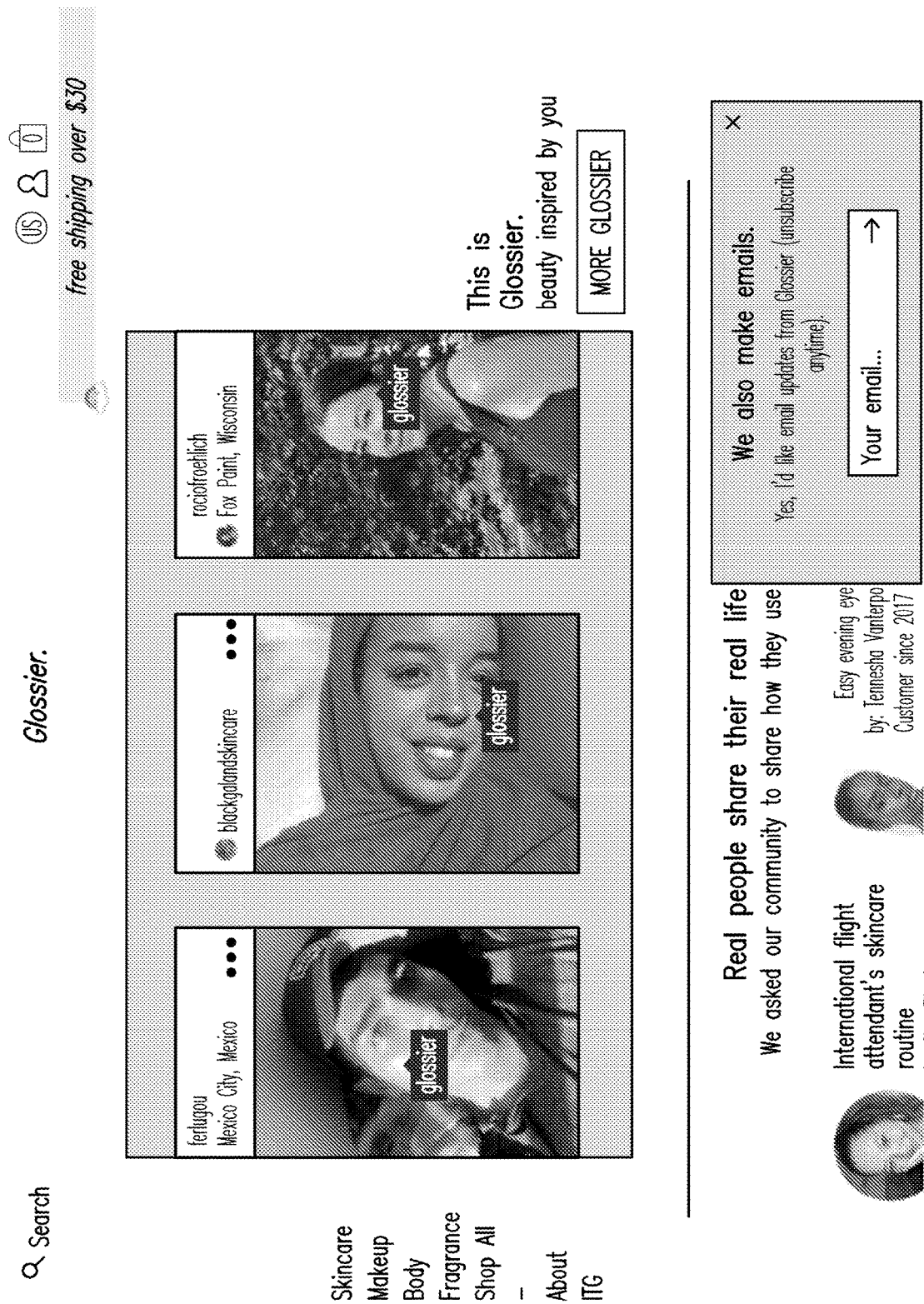

FIG. 12 illustrates the whole of a monitoring system for websites in context. The heart of the monitoring system is "shopping bot" 1200, which may be considered equivalent to the monitoring application 24 on user computing device 2 shown in FIG. 2. This contains two main functional components: the website navigation system 1220 as described above, which has been developed using machine learning to navigate through an arbitrary website structure; and a data capture and processing system 1230 to capture information obtained during website monitoring. The user interface 1215 to this system may establish what websites are to be monitored—this may involve specific websites, specific retailers, or even a search for websites meeting certain parameters, for example by search for particular types of product or service—and this may establish a queue of websites to be evaluated when provided to the shopping bot 1200 by a queue management component 1210. The shopping bot 1200 then interacts with websites over the public internet 4. In some cases, masking or obfuscation may be required if the website is designed only to be used by humans and not by any kind of agent (or additional steps may be needed to address website mechanisms to prevent bot or agent use).

The output from each successful website navigation will be the data captured for that website—specific data to be captured for websites may be predetermined, or it may be determined at the user interface 1215 for the shopping bot 1200. This information will be held in a database 1240 (equivalent to monitoring database 27 in user computing device 2 as shown in FIG. 2, but here shown as a separate system element that may be separate to the device holding a shopping bot 1200—it may in principle receive inputs from a plurality of shopping bots 1200). To investigate transactions further, monitoring may be associated with a transaction investigator 1250 within the transaction scheme which is able to identify transactions during processing—for example, on provision to the issuer for authorisation—and provide this information to an analytics/correlation engine 1260. The transaction investigator essentially obtains a trace of the transaction details and data that are submitted to a payment network to facilitate a payment authorisation—this includes details like amount, timestamp, currency, card details, merchant details, merchant bank (acquirer) details. The analytics/correlation engine 1260, which may be under the control of a monitoring analyst through an analytics user interface 1265, may access the database 1240 using transaction information to reconcile the output of the transaction investigator 1250 with the results of website monitoring stored in the database 1240 for the associated transaction. This allows the monitoring system to have a rich set of technical capabilities that can be used in a wide variety of monitoring use cases.

In providing transaction data, it is desirable to provide data that will result in completion of the steps in the transaction process, but that will not result in a completed transaction (which may be for a random product or service!). It may therefore be desirable for card details to be provided for a card which is preconfigured such that purchases will be declined—for example, if the spending limit for the card is set to zero, or some other mechanism is provided which results in an automatic failure of the transaction through decline of the authorisation request or otherwise. This will mean that the process will not end with an actual completed and cleared transaction, though may mean that the final screen of the process may not indicate transaction success, but may instead indicate that the transaction has failed because of an authorisation failure—but this still indicates that the transaction details have been processed by the transaction scheme, and so may provide all the information required in the monitoring process.

A number of monitoring use cases are considered below with reference to FIGS. 13 to 16.

FIG. 13 illustrates evaluation of a checkout page for proper use of brand materials. In the checkout page shown, there are four uses of Mastercard corporate and product logos, two of which are obsolete usages. Without the capability to view the whole website, this misuse of the logo would not be visible and could not easily be corrected. However, with the possibility of monitoring a large number of websites, including their checkout pages, using embodiments of the disclosure, it becomes possible to communicate systematically with merchants to ensure use of the correct form of the logo.

Figures 14A, 14B:
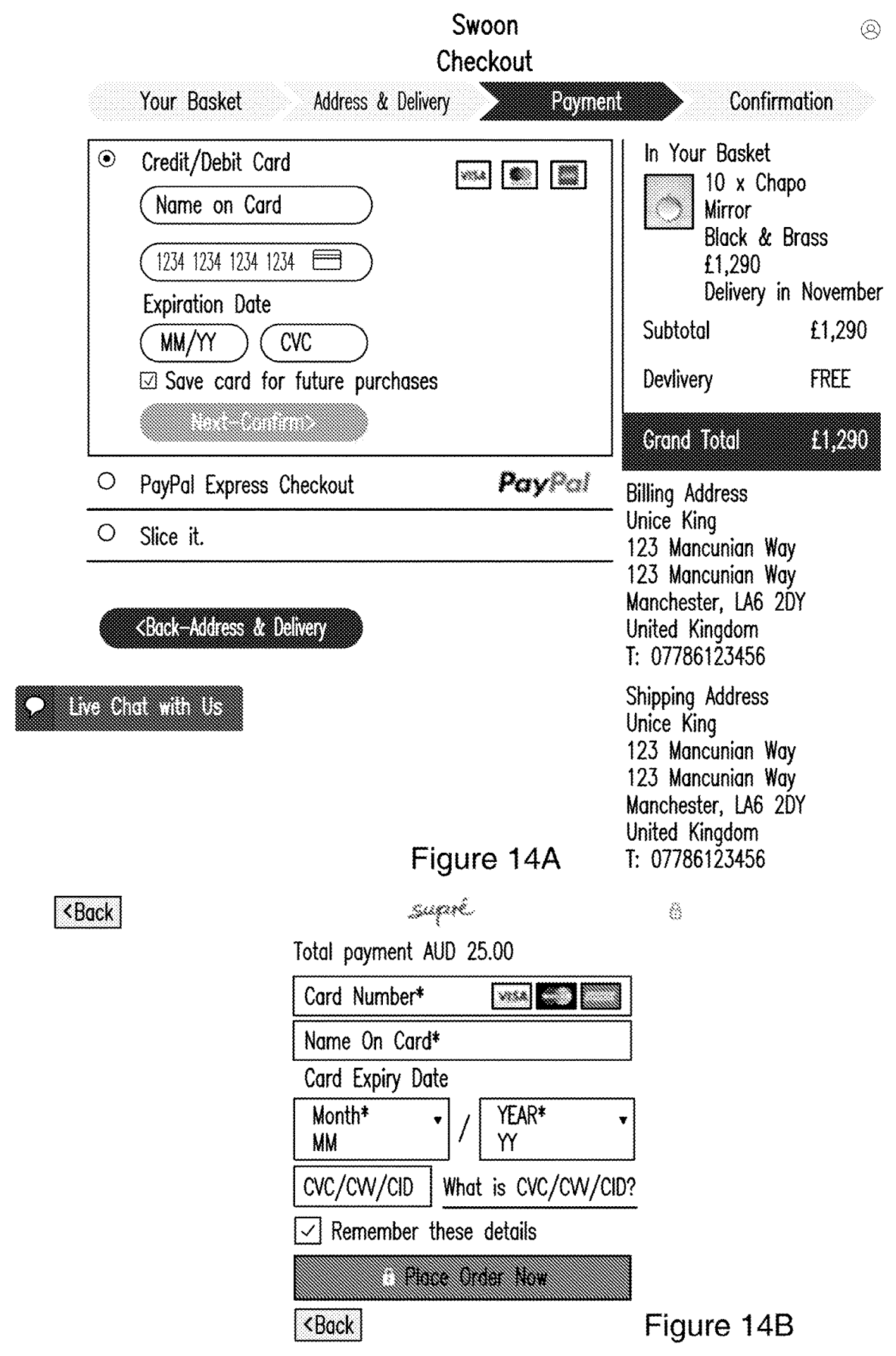

FIGS. 14A, 14B and 14C show three very differently organised checkout pages. In addition to checking for logo usage and other image or text-based features of a page, it is possible to check for functionality. For example, recent EMVCo specifications define a remote checkout functionality known as Secure Remote Commerce (SRC). Using embodiments of the disclosure, it is possible to determine whether SRC is used or whether the merchant webstore uses a different checkout functionality.

FIGS. 15A to 15D illustrate a progression through a webstore from landing page (FIG. 15A), through a product selection page (FIG. 15B) and an initial checkout page (FIG. 15C) establishing whether a customer is an account holder or a guest to a full checkout page (FIG. 15D) for entry of shipping and payment details. There are many different possibilities for how such pages can be structured and organised—use of embodiments of the disclosure allows much of this information to be captured so different approaches to providing a webstore can be analysed with a view, for example, to optimising payment functionality. It is also possible to determine what data is requested from a customer by different merchants—this is useful market intelligence, but it may also indicate that a website is not properly complying with laws relating to use of personal data. It may also be possible to determine if one payment vendor is favoured over another in the organisation of the website.

Figure 16:
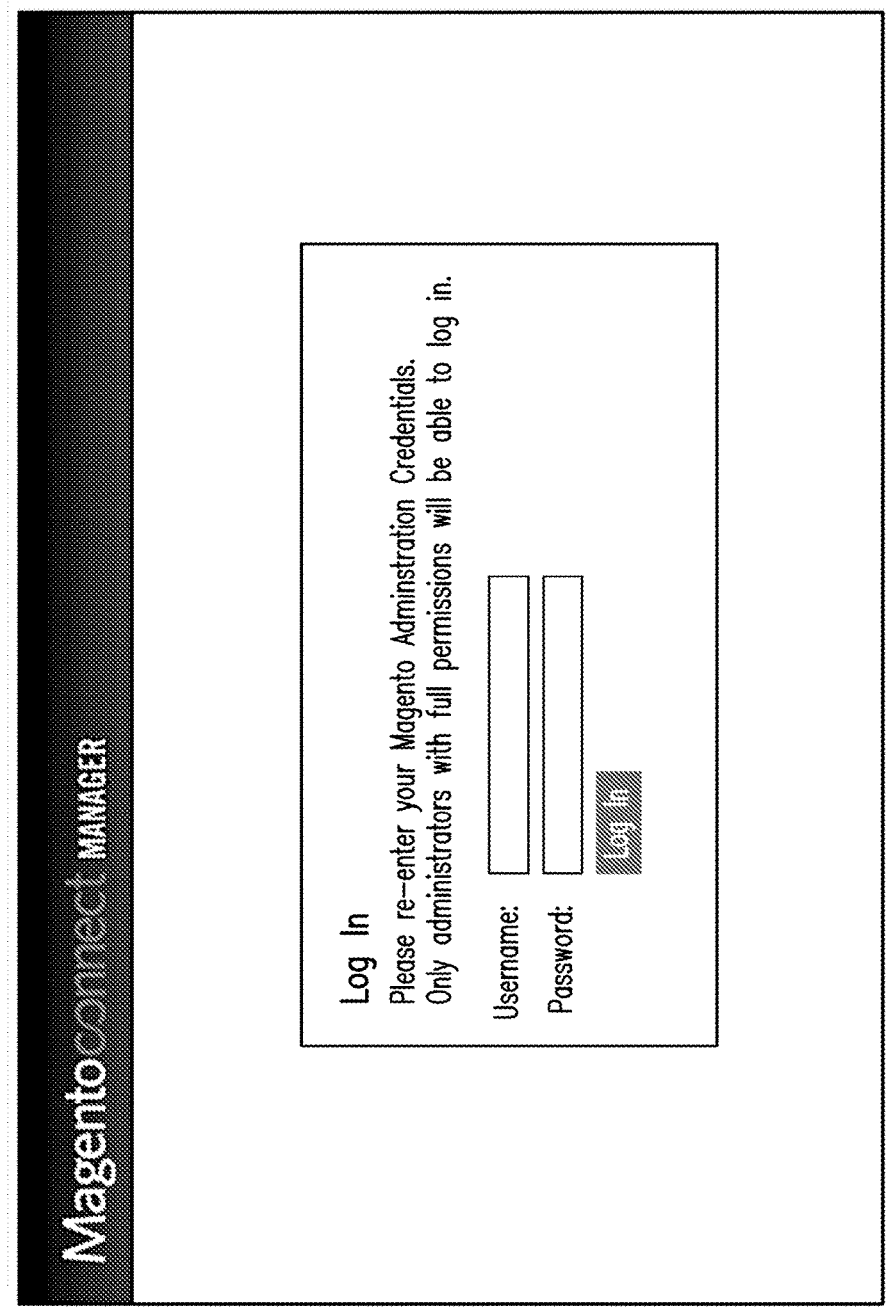
FIG. 16 shows use of an embodiment of the disclosure to detect potential exposure to cyberattacks such as digital skimming.

FIG. 16 illustrates Magento Connect Manager, which is used to install extensions to the PHP e-commerce platform Magento. The version of software used by e-commerce platforms may be extremely relevant to security considerations given the scale of adoption of the given platform. Periodically, cyber criminals find vulnerabilities in e-commerce platforms or software components and then exploit these at scale—often by stealing card details in a "digital skimming" attack. When these are discovered, they are generally protected against, but older versions of software (such as here Magento Connect Manager) may be vulnerable. By determining versions of software that are used in the specific website—information that is typically obtainable from the website, as here, an assessment of vulnerability may be made efficiently and at scale.

Other types of vulnerability may be detected. For example, a recent high-profile JavaScript injection that leverages chatbots to skim card data is known to have become popular. The shopping bot could be used to identify websites containing chatbots as a starting point for security researchers to identify 'at risk' websites The act of monitoring in this way may itself be valuable in identifying vulnerabilities. By completing transactions with cards that will be declined across merchant websites, we can seed the ecosystem with tracked cards. If such a card is, for example, revealed as having been used on the dark web after digital skimming, the very use of the card may be used to pinpoint compromised merchants, acquirers and PSPs.

Figure 17:
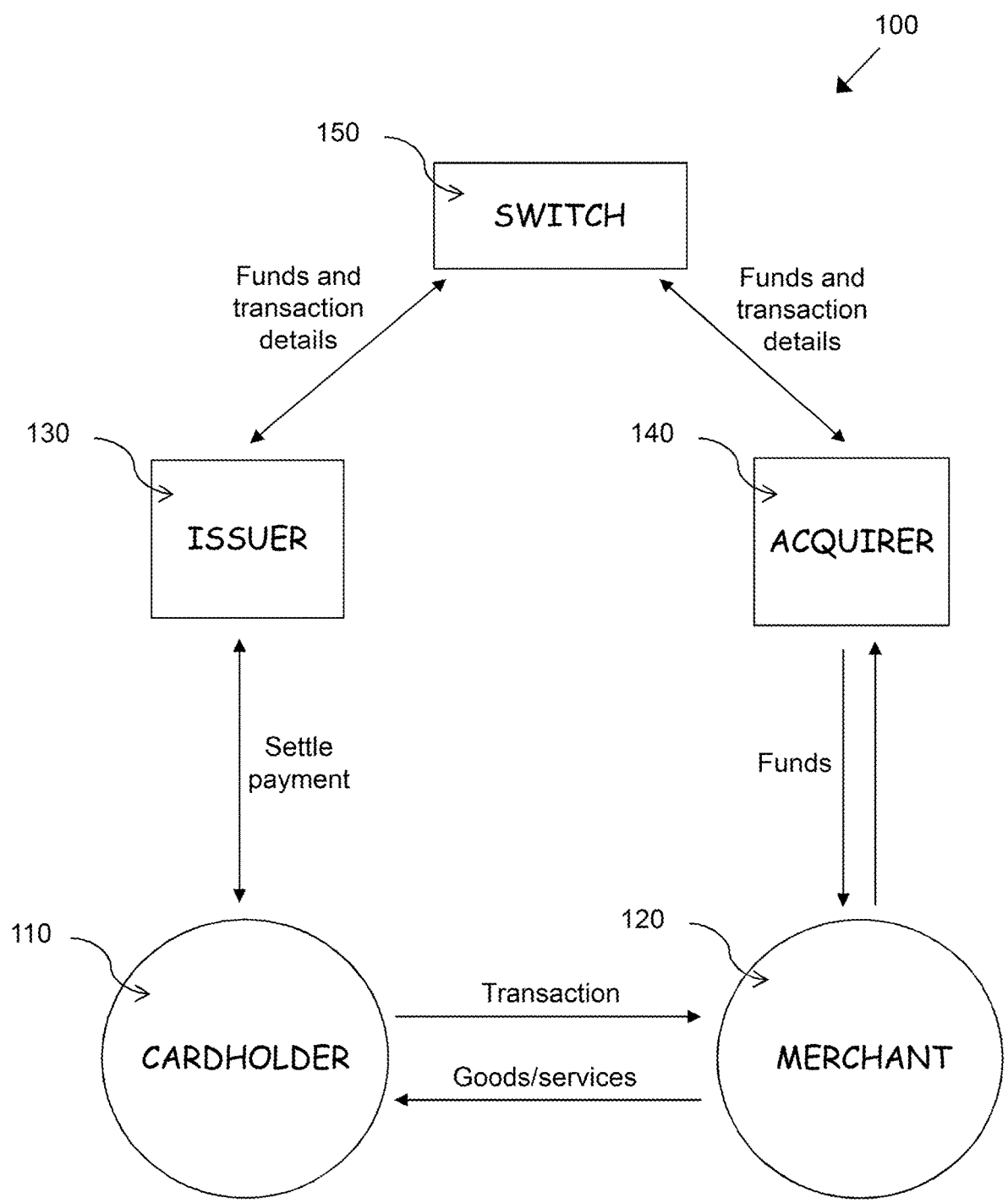
FIG. 17 shows operation of a transaction scheme in accordance with a four-party model.

For completeness, an explanation of the four-party model for a transaction scheme will be provided with reference to FIG. 17. FIG. 17 is a block diagram of a typical four-party model or four-party payment transaction scheme. The diagram illustrates the entities present in the model and the interactions occurring between entities operating in a card scheme.

Normally, card schemes—payment networks linked to payment cards—are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, issuer 130 and acquirer 140. In this model, the cardholder 110 purchases goods or services from the merchant 120. The issuer 130 is the bank or any other financial institution that issued the card to the cardholder 110. The acquirer 140 provides services for card processing to the merchant 120.

The model also comprises a central switch 150—interactions between the issuer 130 and the acquirer 140 are routed via the switch 150. The switch 150 enables a merchant 120 associated with one particular bank acquirer 140 to accept payment transactions from a cardholder 110 associated with a different bank issuer 130.

A typical transaction between the entities in the four-party model can be divided into two main stages: authorisation and settlement. The cardholder 110 initiates a purchase of a good or service from the merchant 120 using their card. Details of the card and the transaction are sent to the issuer 130 via the acquirer 140 and the switch 150 to authorize the transaction. The cardholder 110 may have provided verification information in the transaction, and in some circumstances may be required to undergo an additional verification process to verify their identity (such as 3-D Secure in the case of an online transaction). Once the additional verification process is complete the transaction is authorized.

On completion of the transaction between the cardholder 110 and the merchant 120, the transaction details are submitted by the merchant 120 to the acquirer 140 for settlement.

The transaction details are then routed to the relevant issuer 130 by the acquirer 140 via the switch 150. Upon receipt of these transaction details, the issuer 130 provides the settlement funds to the switch 150, which in turn forwards these funds to the merchant 120 via the acquirer 140.

Separately, the issuer 130 and the cardholder 110 settle the payment amount between them. In return, a service fee is paid to the acquirer 140 by the merchant 120 for each transaction, and an interchange fee is paid to the issuer 130 by the acquirer 140 in return for the settlement of funds.

The skilled person will appreciate that the embodiments described here are exemplary, and that modifications may be made and alternative embodiments provided that fall within the scope of the disclosure. Moreover, the person skilled in the art will appreciate that the approach described here is not limited to navigation and measurement of transaction related websites, but may be applied to other website structures which involve a sequence of steps that need to be navigated to obtain a particular functional result, and these may be addressed by further embodiments of the disclosure.

What is claimed is:

1. A method of measuring parameters associated with a website comprising a complex hierarchy of web pages, wherein the website is adapted to support a user journey through multiple web pages to a user destination, the method comprising:

defining the user journey through the website as a sequence of functional steps;

navigating, by one or more processors of a website navigation system, using a trained machine learning system, from a landing screen to a destination screen by performing each functional step in the sequence, wherein the website navigation system includes a database of verified data field information; and wherein navigating is based on a functional type of one or more screens, which is identified by classification of an image of the one or more screens by the trained machine learning system, wherein the one or more screens include the landing screen, an intermediate screen, and/or the destination screen;

wherein the navigating includes determining, by the one or more processors of the website navigation system, that a data field in the one or more screens needs to be filled to perform one of the functional steps and filling, by the one or more processors of the website navigation system, the data field on the one or more screens with verified data field information for the data field from the database; and measuring, by one or more processors of a website measurement system, one or more parameters resulting from, or associated with, one or more steps of the journey through the website from the landing screen to the destination screen for the website.

2. The method as claimed in claim 1, wherein the functional steps comprise action steps to advance the user journey to a web page to meet one or more functional requirements, and verification steps to verify that one or more functional requirements associated with a web page have been met.

3. The method as claimed in claim 2, wherein the action steps comprise one or more of activating a button, selecting from a menu and filling a data field.

4. The method as claimed in claim 1, wherein the verified data field information comprises address information.

5. The method as claimed in claim 1, wherein the verified data field information comprises payment card information.

6. The method as claimed in claim 5, wherein the payment card information relates to a legitimate payment card adapted such that transaction authorization will be declined.

7. The method as claimed in claim 1, wherein the website is an e-commerce website, and wherein the destination screen is a screen indicating that a transaction has been performed using the e-commerce website.

8. The method as claimed in claim 1, wherein measuring one or more parameters comprises detecting specific text or images on one or more web pages of the website.

9. The method as claimed in claim 1, wherein measuring one or more parameters comprises detecting specific functionality on one or more pages of the website.

10. The method as claimed in claim 1, wherein measuring one or more parameters comprises detecting specific security vulnerabilities on one or more pages of the website.

11. A computing system adapted to measure parameters associated with a website comprising a complex hierarchy of web pages, wherein the website is adapted to support a user journey through multiple web pages of the website to a user destination, the computing system comprising:

a website navigation system including one or more first processors and a database of verified data field information, wherein the website navigation system is configured, by a trained machine learning system, to navigate an arbitrary website adapted to reach the user destination by navigating from a landing screen to a destination screen by a user journey defined as a sequence of functional steps, wherein the website navigation system is trained to navigate from the landing screen to the destination screen by identifying a functional type of at least one screen, based on classification, by the trained machine learning system, of an image of the at least one screen and by performing each functional step, based on the identified functional type, in the sequence of functional steps;

wherein the website navigation system is configured to perform one or more of the functional steps by determining that a data field in the one or more screens needs to be filled to perform one of the functional steps and filling the data field on the one or more screens with verified data field information for the data field from the database; and a website measurement system including one or more second processors, wherein the website measurement system is configured to use the website navigation system to navigate through the arbitrary website whereupon the website measurement system is configured to measure one or more parameters resulting from, or associated with, one or more steps of the journey through the website from the landing screen to the destination screen for the website.

* * * * *